United States Patent [19]
Zigler et al.

[11] Patent Number: 5,953,119
[45] Date of Patent: Sep. 14, 1999

[54] OPTICAL SHUTTER ASSEMBLY FOR TRACE ELEMENT DETECTOR

[75] Inventors: Arie Zigler, Rishon, Israel; Jim Galambos, Alexandria, Va.; Lorrin Redden, Park City; Michael Nelson, Murray, both of Utah

[73] Assignee: APTI Inc., Washington, D.C.

[21] Appl. No.: 09/059,133

[22] Filed: Apr. 13, 1998

[51] Int. Cl.⁶ .................................................. G01J 3/28
[52] U.S. Cl. ......................... 356/326; 356/318; 359/508
[58] Field of Search ........................... 359/227, 232–235, 359/889, 892, 508

[56] References Cited

U.S. PATENT DOCUMENTS

| | | |
|---|---|---|
| 2,607,899 | 8/1952 | Cary et al. . |
| 3,790,289 | 2/1974 | Schmidt . |
| 5,379,103 | 1/1995 | Zigler . |

*Primary Examiner*—K P Hantis
*Attorney, Agent, or Firm*—Rossi & Associates

[57] ABSTRACT

A shutter assembly for a trace element detector includes a shutter wheel having at least one window, and a drive mechanism coupled to the shutter wheel, wherein the drive mechanism rotates the shutter wheel to move the window between at least an outlet port of the shutter assembly and a cleaning station of the shutter assembly. The cleaning station includes at least one cleaning jet positioned to apply a cleaning solution to the window when the window is located at the cleaning station. In the preferred embodiment, the shutter assembly further includes a drying station, and the drive mechanism rotates the shutter wheel to move the window to the drying station after the window has passed the cleaning station. The drying station includes at least one gas jet positioned to apply a gas stream to the window when the window is located at the drying station. A control mechanism controls the application of the cleaning fluid to the cleaning jet and the application of the gas stream to the gas jet, as either continuous flows or intermittent pulses. The cleaning station and the drying station are preferably isolated by the use of a base plate including a separating wall. The base plate is also provided with drain ports to allow excess cleaning solution to drain from the shutter assembly.

18 Claims, 5 Drawing Sheets

OPTICAL SHUTTER ASSEMBLY FOR TRACE ELEMENT DETECTOR

FIELD OF THE INVENTION

The invention relates in general to detection devices that detect minute amounts of trace elements using laser induced spectroscopy. In particular, the invention is directed to an optical shutter assembly for use with a trace element detector device that overcome problems associated with the buildup of debris on the focusing lens of the trace element detector device in direct monitoring applications.

BACKGROUND OF THE INVENTION

Laser induced spectroscopy is utilized to detect minute amounts of trace elements in material samples. For example, U.S. Pat. No. 5,379,103 issued to Zigler on Jan. 3, 1995, the contents of which are incorporated herein by reference, discloses a method and apparatus for in situ detection of minute amounts of trace elements, wherein a laser energy pulse from a laser source is focused on the surface of an analysis sample by a focusing lens or other optical means to vaporize a portion of the sample and thereby generate a plasma. Spectral changes emitted by the plasma are analyzed with a spectrometer to identify trace elements within the analysis sample.

It has been proposed to utilize trace element detectors of the type described above to directly monitor various material streams, such as powders and slurried mixtures of solids and waters, during normal processing operations, as opposed to taking a discrete sample of the material stream to a laboratory site for analysis. Direct monitoring provides many advantages over discrete sampling, including the ability to adjust the process being monitored in real time based on the results of the analysis. It has been found, however, that the inherently dusty and dirty conditions associated with direct monitoring of material streams in certain applications, for example in mining and ore refining operations, requires frequent cleaning of the focusing lense of the trace element detector. In addition, the vaporization of the material sample stream during the detection and analysis process creates miniature shock waves that result in small amounts of the sample material being scattered onto the focusing lens of the trace element detector. As a result, the overall efficiency of the direct monitoring process suffers due to the necessity of frequently cleaning the focusing lens of the trace element detector.

In view of the above, it is an object of the invention to provide a mechanism that permits direct monitoring of a material stream with a trace element detector while overcoming the problems associated with the buildup of debris on the focusing lens, thereby allowing highly efficient operation of the trace element detector.

SUMMARY OF THE INVENTION

The invention provides a mechanism that permits direct monitoring of a material stream with a trace element detector while preventing the buildup of debris on the focusing lens of the detector. In a preferred embodiment, a shutter assembly for a trace element detector is provided that includes a shutter wheel having at least one window, and a drive mechanism coupled to the shutter wheel, wherein the drive mechanism rotates the shutter wheel to move the window between at least an outlet port of the shutter assembly and a cleaning station of the shutter assembly. The cleaning station includes at least one cleaning jet positioned to apply a cleaning solution to the window when the window is located at the cleaning station. In the preferred embodiment, the shutter assembly further includes a drying station, and the drive mechanism rotates the shutter wheel to move the window to the drying station after the window has passed the cleaning station. The drying station includes at least one gas jet positioned to apply a gas stream to the window when the window is located at the drying station. A control mechanism controls the application of the cleaning fluid to the cleaning jet and the application of the gas stream to the gas jet, as either continuous flows or intermittent pulses. The cleaning station and the drying station are preferably isolated by the use of a base plate including a separating wall. The base plate is also provided with drain ports to allow excess cleaning solution to drain from the shutter assembly.

The above described shutter assembly can be utilized in a trace element detector that includes a laser source, a spectrometer and a optical system for directing a laser pulse generated by the laser source through the outlet port of the shutter assembly and for directing spectral emissions from a sample material to the spectrometer when the window is located at the outlet port. The shutter assembly is particularly useful in direct monitoring application in which the trace element detector is located directly above or in close proximity to a material stream to be sampled.

Various advantages features and objects of the invention will become apparent from a review of the following detailed description of the preferred embodiment of the invention and the accompanying drawings.

BRIEF DESCRIPTION OF THE DRAWINGS

The invention will be described with reference to certain preferred embodiments thereof and the accompanying drawings, wherein.

DETAILED DESCRIPTION OF THE PREFERRED EMBODIMENT

Figure 1:
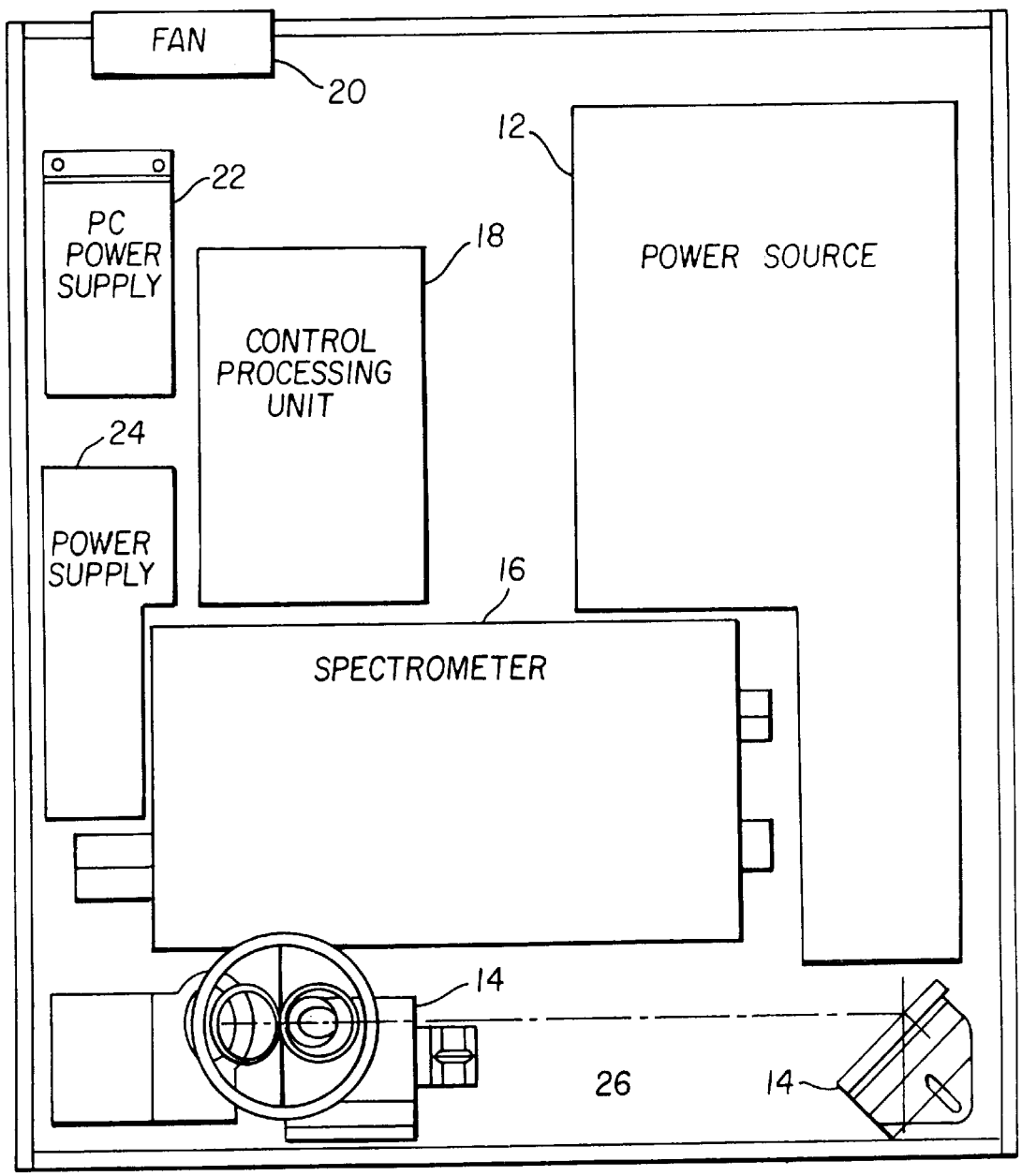
FIG. 1 is a top view of a trace element detector in accordance with the invention with a top cover removed.
Figure 2:
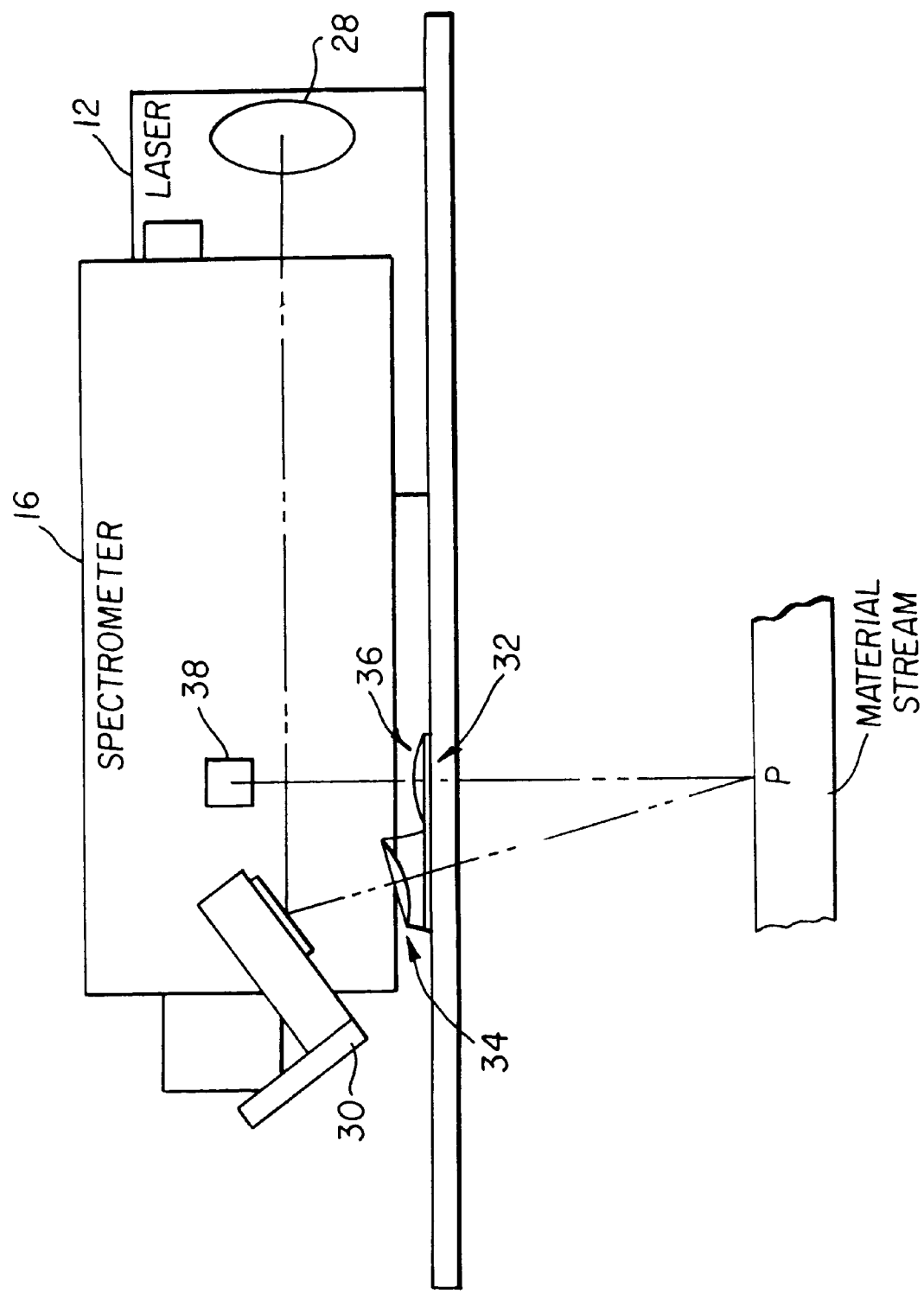
FIG. 2 is a schematic illustration of the optical system incorporated in the trace element detector shown in FIG. 1.

Referring now to FIG. 1, a top view of a trace element detector 10 in accordance with the present invention is shown with its top cover removed as including a laser source 12, an optical system 14, a spectrometer 16, a control processing unit 18, a cooling fan 20 and power supplies 22, 24 mounted to a base plate 26. As schematically illustrated in FIG. 2, the optical system 14 includes a first mirror 28 that reflects a laser pulse generated by the laser source 12 by ninety degrees to a second mirror 30. The second mirror 30 reflects the laser pulse through a focusing lens 34 of a lens mount 32 to a material sampling point (P) located in a material stream passing beneath the trace element detector 10. Spectral response signals generated by plasma created at the material sampling point (P) by the application of the laser pulse to the material stream are focused by a second lens 36 and reflected to the spectrometer 16 by a third mirror 38. Detection signals generated by photo diode array of a detection portion of the spectrometer 16 are supplied to the control processing unit 18 for processing and evaluation to determine the concentration of various elements within the material stream. In a preferred embodiment, a computer workstation (not shown) is coupled to the control processing unit 18 to receive and process the detection signals and to act as an operator interface.

Figure 3:
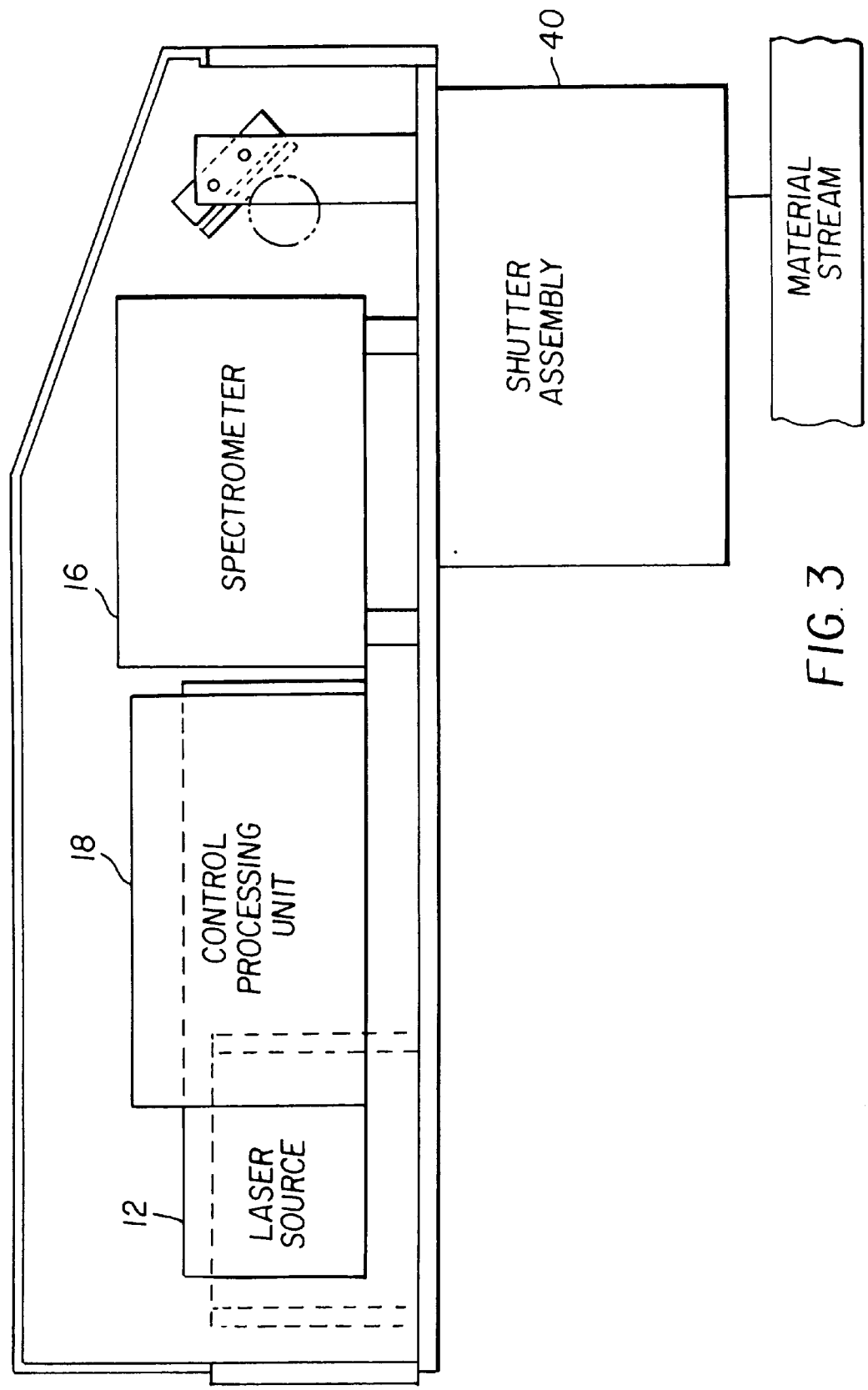
FIG. 3 is a side view of the trace element detector illustrated in FIG. 1 with the top cover.
Figure 4:
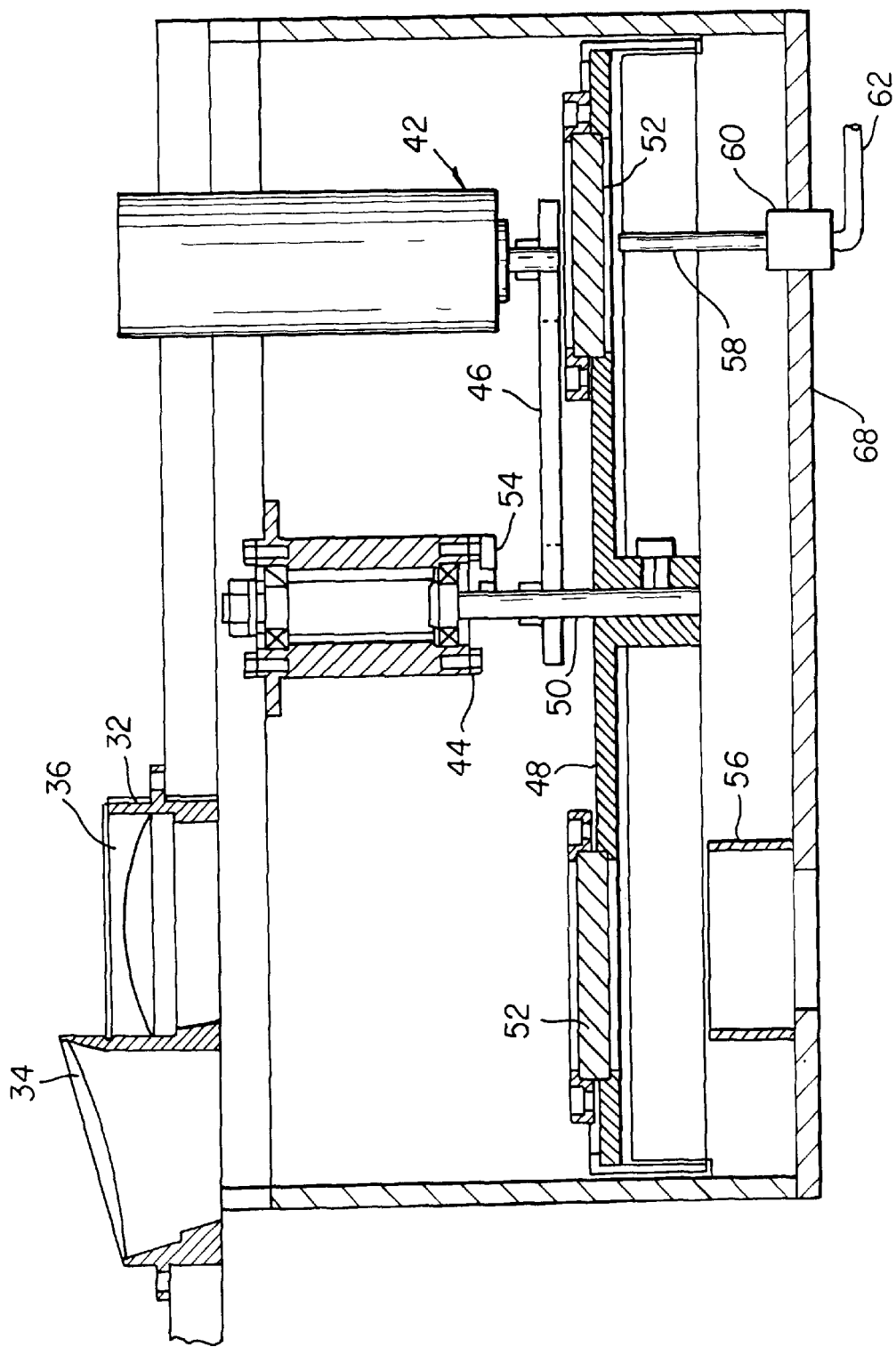
FIG. 4 is a partial cut away view of the shutter assembly incorporated in the trace element detector illustrated in FIG. 1.

As shown in FIG. 3, a shutter assembly 40 is located below the optical system 14 such that the shutter assembly 40 is located in the path of the laser pulse prior to its impingement on the material stream. As shown in detail in FIG. 4, the shutter assembly 40 includes a motor 42 that drives a rotating shutter wheel assembly 44 via a drive belt 46. The shutter wheel assembly 44 includes a circular mounting plate 48 coupled to a rotatable shaft 50. In the illustrated embodiment, at least two windows 52, preferably made of borosilicate glass or an equivalent material that is transparent to both the transmission of the laser pulse generated by the laser source and the light emitted from the excited plasma, are mounted on the mounting plate 48. An encoder 54 is also provided to detect the rotation of the shaft 50 and supply a position signal to the control processing unit 18, thereby allowing the control processing unit 18 to synchronize the generation of the laser pulse from the laser source 12 with the rotation of one of the windows 52 over an outlet port 56 of the shutter assembly 40, namely, when a window 52 is positioned above the outlet port 56, the laser pulse can pass through the window 52 and the outlet port 56 to impinge on the material to be sampled. Similarly, light emitted from the plasma generated by the application of the laser pulse to the sampled material is transmitted back through the outlet port 56 and the window 52 to the lens 36.

As stated above, debris can accumulate on the windows 52 due to the environmental conditions present at the sampling sight or from the scattering of sampling material by the application of the laser pulse. Accordingly, the shutter assembly 40 is provided with a cleaning station 58 at which one or more cleaning jets 60 are provided to spray a cleaning solution (in most applications simply water) on the windows 52 after the windows 52 are rotated past the outlet port 56. The cleaning solution is supplied to the cleaning jets 60 from a pressurized supply line 62 that is coupled to the cleaning jets 60. The supply of cleaning solution to the cleaning jets 60 can either be a continuous flow or controlled by the control processing unit 18, by operating a valve in the supply line 62 or in the cleaning jets 60, to be one or more intermittent pulses.

Figure 5:
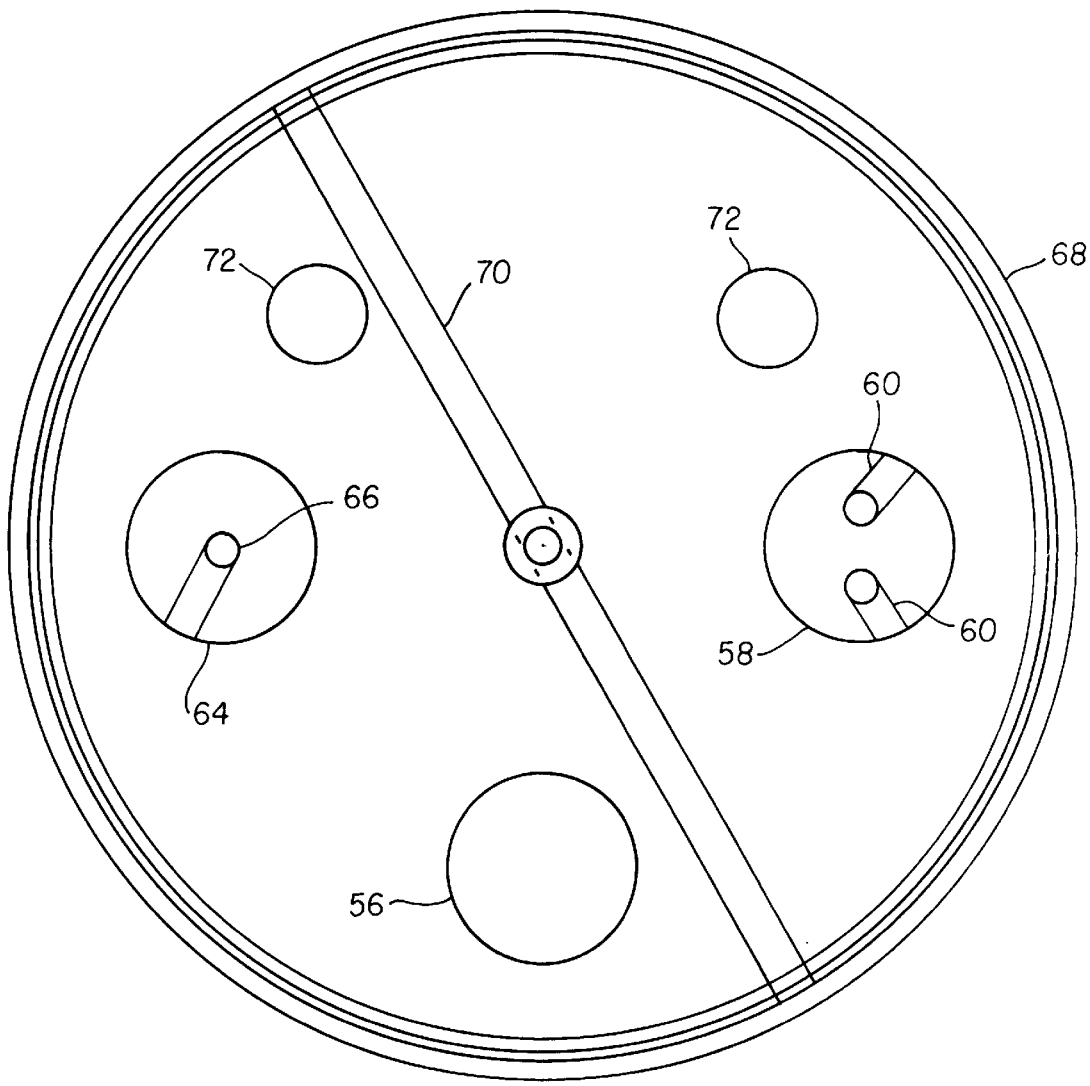
FIG. 5 is a top view of a preferred base plate for the shutter assembly illustrated in FIG. 4.

It is further desirable to provide mechanism for drying the windows 52 after the application of the cleaning solution at the cleaning station 58. Accordingly, a drying station 64 including at least one gas jet 66 is provided at a further location as shown in a top view of a preferred base plate 68 of the shutter assembly 40 illustrated in FIG. 5. The gas jet 66 is coupled to a gas supply line (not shown) which supplies a drying gas (typically just air) to the gas jet 66. As with the supply of cleaning solution, the supply of gas to the gas jet 66 can be either a continuous flow or controlled by the control processing unit 18 to be one or more intermittent pulses. In the embodiment illustrated in FIG. 5, a separating wall 70 is also provided to insure that the cleaning solution sprayed on the windows 52 by the cleaning jets 60 is isolated from and does not interfere with measurements being taken at the outlet port 56. Drain ports 72 are also provided to allow the cleaning solution to drain from the shutter assembly 40.

The invention has been described with reference to certain preferred embodiments thereof It will be understood, however, that modifications and variations are possible within the scope of the appended claims. For example, it will be understood that the arrangement of the various components of the trace element detector 10 and the optical system 14 may vary from the preferred illustrated embodiment. It is only necessary that an appropriate mechanism be provided to direct the laser pulse generated by the laser source 12 to the material stream and to direct the resulting spectral response signals generated at the material sampling point (P) to the spectrometer 16. Still further, the mounting plate 48 can be directly connected to the rotor of the motor 42 instead of being located on a separate rotatable shaft 50, thereby simplifying the drive mechanism. Other modifications are also possible within the scope of the claims.

What is claimed is:

1. A shutter assembly for a trace element detector comprising:

a shutter wheel including at least one window; and a drive mechanism coupled to the shutter wheel;

wherein said drive mechanism rotates the shutter wheel to move the window between at least an outlet port of the shutter assembly and a cleaning station of the shutter assembly;

wherein the cleaning station includes at least one cleaning jet positioned to apply a cleaning solution to the window when the window is located at the cleaning station; and wherein the shutter assembly further includes a drying station, and said drive mechanism rotates the shutter wheel to move the window to the drying station after the window has passed the cleaning station.

2. A shutter assembly as claimed in claim 1, wherein the drying station includes at least one gas jet positioned to apply a gas stream to the window when the window is located at the drying station.

3. A shutter assembly as claimed in claim 2, further comprising a control mechanism for controlling the application of the cleaning fluid to the cleaning jet and the application of the gas stream to the gas jet.

4. A shutter assembly as claimed in claim 3, wherein the control mechanism controls the application of at least one of the cleaning fluid and the gas stream as intermittent pulses.

5. A shutter assembly as claimed in claim 2, further comprising isolation means for isolating the cleaning station from the drying station.

6. A shutter assembly as claimed in claim 5, wherein the isolation means includes a base plate including a separating wall.

7. A shutter assembly as claimed in claim 6, wherein the base plate further includes at least one drain port.

8. A shutter assembly as claimed in claim 3, wherein the control mechanism includes an encoder that generates a signal indicative of the position of the shutter wheel.

9. An apparatus comprising:

a laser source;

a spectrometer;

a shutter assembly including a shutter wheel having at least one window, and a drive mechanism coupled to the shutter wheel, wherein said drive mechanism rotates the shutter wheel to move the window between at least an outlet port of the shutter assembly and a cleaning station of the shutter assembly; and an optical system for directing a laser pulse generated by the laser source through the outlet port of the shutter assembly and for directing spectral emissions from a sample material to the spectrometer when the window is located at the outlet port.

10. An apparatus as claimed in claim 9, wherein the cleaning station includes at least one cleaning jet positioned to apply a cleaning solution to the window when the window is located at the cleaning station.

11. An apparatus as claimed in claim 10, wherein the shutter assembly further includes a drying station, and said drive mechanism rotates the shutter wheel to move the window to the drying station after the window has passed the cleaning station.

12. A shutter assembly as claimed in claim 11, wherein the drying station includes at least one gas jet positioned to apply a gas stream to the window when the window is located at the drying station.

13. A shutter assembly as claimed in claim 12, further comprising a control mechanism for controlling the application of the cleaning fluid to the cleaning jet and the application of the gas stream to the gas jet.

14. A shutter assembly as claimed in claim 13, wherein the control mechanism controls the application of at least one of the cleaning fluid and the gas stream as intermittent pulses.

15. A shutter assembly as claimed in claim 12, further comprising isolation means for isolating the cleaning station from the drying station.

16. A shutter assembly as claimed in claim 15, wherein the isolation means includes a base plate including a separating wall.

17. A shutter assembly as claimed in claim 16, wherein the base plate further includes at least one drain port.

18. A shutter assembly as claimed in claim 13, wherein the control mechanism includes an encoder that generates a signal indicative of the position of the shutter wheel.

* * * * *